US010554693B2

(12) United States Patent
Miao et al.

(10) Patent No.: US 10,554,693 B2
(45) Date of Patent: Feb. 4, 2020

(54) SECURITY CONFIGURATION METHOD FOR RADIO BEARER AND DEVICE (71) Applicant: HUAWEI TECHNOLOGIES CO., LTD., Shenzhen, Guangdong (CN)

(72) Inventors: Jinhua Miao, Shenzhen (CN); Jian Zhang, Beijing (CN); Wei Quan, Beijing (CN); Xun Tang, Beijing (CN); Bingzhao Li, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/123,470

(22) Filed: Sep. 6, 2018

(65) Prior Publication Data
US 2019/0020688 A1    Jan. 17, 2019

Related U.S. Application Data (63) Continuation of application No. PCT/CN2016/075867, filed on Mar. 8, 2016.

(51) Int. Cl.
*H04W 12/10* (2009.01)
*H04L 29/06* (2006.01)

(52) U.S. Cl.
CPC ............. *H04L 63/20* (2013.01); *H04W 12/10* (2013.01); *H04L 2209/80* (2013.01)

(58) Field of Classification Search
CPC ... H04L 63/20; H04L 41/0806; H04L 63/205; H04W 12/10; H04W 12/02
(Continued)

(56) References Cited

U.S. PATENT DOCUMENTS

2009/0103553 A1    4/2009  Lin
2016/0192245 A1*   6/2016  He ................ H04W 36/0033
                                                   370/331
2018/0376386 A1*   12/2018 Yi ................ H04W 36/0072

FOREIGN PATENT DOCUMENTS

CN    102158871 A    8/2011
CN    104901856 A    9/2015
(Continued)

OTHER PUBLICATIONS

3GPP TS 23.401 V13.5.0 (Dec. 2015), 3rd Generation Partnership Project; Technical Specification Group Services and System Aspects; General Packet Radio Service (GPRS) enhancements for Evolved Universal Terrestrial Radio Access Network (E-UTRAN) access(Release 13), 337 pages.
(Continued)

*Primary Examiner* — Sam Bhattacharya
(74) *Attorney, Agent, or Firm* — Womble Bond Dickinson (US) LLP (57) ABSTRACT

Embodiments of the present disclosure disclose a security configuration method for a radio bearer and a device. The method may include: obtaining, by a base station, a first security configuration message, where the first security configuration message is used to indicate whether security configuration needs to be performed on each of N radio bearers set up between the base station and a terminal device, and indicate security configuration parameters for M radio bearers on which security configuration needs to be performed, where N is a positive integer, M is an integer, and M≤N; and sending, by the base station, the first security configuration message to the terminal device. According to the embodiments of the present disclosure, applicability of security configuration can be improved.

16 Claims, 4 Drawing Sheets

(58) Field of Classification Search
USPC .............. 455/410, 411, 422.1; 370/245, 338
See application file for complete search history.

(56) References Cited

FOREIGN PATENT DOCUMENTS

| EP | 2608623 | A1 | 6/2013 |
|---|---|---|---|
| EP | 2611227 | A1 | 7/2013 |
| WO | 2008003256 | A1 | 1/2008 |
| WO | 2012078092 | A2 | 6/2012 |

OTHER PUBLICATIONS

3GPP TS 23.203 V13.6.0 (Dec. 2015), 3rd Generation Partnership Project;Technical Specification Group Services and System Aspects; Policy and charging control architecture (Release 13), 242 pages.

3GPP TS 33.401 V13.1.0 (Dec. 2015), 3rd Generation Partnership Project; Technical Specification Group Services and System Aspects; 3GPP System Architecture Evolution (SAE); Security architecture(Release 13), 135 pages.

3GPP TS 36.323 V13.0.0 (Dec. 2015), 3rd Generation Partnership Project; Technical Specification Group Radio Access Network; Evolved Universal Terrestrial Radio Access (E-UTRA); Packet Data Convergence Protocol (PDCP) specification(Release 13), 36 pages.

3GPP TS 36.413 V13.1.0 (Dec. 2015), 3rd Generation Partnership Project; Technical Specification Group Radio Access Network; Evolved Universal Terrestrial Radio Access Network(E-UTRAN); S1 Application Protocol (S1AP)(Release 13), 314 pages.

3GPP TS 36.331 V13.1.0 (Mar. 2016), 3rd Generation Partnership Project; Technical Specification Group Radio Access Network; Evolved Universal Terrestrial Radio Access (E-UTRA); Radio Resource Control (RRC); Protocol specification(Release 13), 551 pages.

* cited by examiner

SECURITY CONFIGURATION METHOD FOR RADIO BEARER AND DEVICE

CROSS-REFERENCE TO RELATED APPLICATIONS

This application is a continuation of International Patent Application No. PCT/CN2016/075867, filed on Mar. 8, 2016, the disclosure of which is hereby incorporated by reference in its entirety.

TECHNICAL FIELD

The present disclosure relates to the mobile communications field, and in particular, to a security configuration method for a radio bearer and a device.

BACKGROUND

With development of mobile communications network technologies, currently network security configuration requirements become higher. A currently common security configuration policy is performing same security configuration on all radio bearers corresponding to a user plane or all radio bearers of a same terminal. The user plane may be used to transmit service data of a terminal device, and a control plane may be used to manage the user plane, generate control signaling, and the like. A radio bearer in the user plane may be understood as a radio bearer for transmitting service data, and a radio bearer in the control plane may be understood as a radio bearer for transmitting control signaling. However, during actual application, terminal devices are different, and radio bearers used for communication are also different. Using different radio bearers of a same terminal device as an example, different radio bearers between the terminal device and a base station may be used to transmit different data services. For example, a bearer may be used to transmit voice data, a bearer may be used to transmit web page data, and a bearer may be used to transmit payment data. If same security configuration is performed on all radio bearers corresponding to a user plane or all radio bearers of a same terminal, a problem that current security configuration is not applicable to a current terminal device or radio bearer may be caused. It can be learned that applicability of security configuration in current security configuration technologies is relatively poor.

SUMMARY

Embodiments of the present disclosure provide a security configuration method for a radio bearer and a device, to improve applicability of security configuration.

An embodiment of the present disclosure provides a security configuration method for a radio bearer, including:

obtaining, by a base station, a first security configuration message, where the first security configuration message is used to indicate whether security configuration needs to be performed on each of N radio bearers set up between the base station and a terminal device, and indicate security configuration parameters for M radio bearers on which security configuration needs to be performed, where N is a positive integer, M is an integer, and M≤N; and sending, by the base station, the first security configuration message to the terminal device.

In this embodiment, the security configuration parameter may be separately configured for the bearer of the terminal device. Therefore, applicability of security configuration can be improved.

In a possible embodiment, the first security configuration message includes a first bearer list, where the first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

In this embodiment, the default security configuration parameter is used, so that there is no need to transmit a security configuration parameter. Therefore, a communications resource can be saved. In addition, when the bearer list includes the bearer identifiers of the M radio bearers and the security configuration parameter of each of the M radio bearers, that is, includes only the bearer identifiers and the security configuration parameters of the M radio bearers on which security configuration needs to be performed, the communications resource can be saved.

In a possible embodiment, the security configuration parameter includes one or more of the following parameters: an integrity protection parameter and an encryption parameter.

In a possible embodiment, the obtaining, by a base station, a first security configuration message includes:

receiving, by the base station, a second security configuration message sent by a management entity, where the second security configuration message is used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M; and generating, by the base station, the first security configuration message based on the second security configuration message and a context of the terminal device.

In this embodiment, security configuration parameters may be correspondingly distinguished based on services, and targeted matching between a security configuration parameter and a service feature is more easily performed in the management entity. Therefore, precision of the security configuration parameter configured by the terminal device for the radio bearer may be higher by using the second security configuration message sent by the management entity.

In a possible embodiment, the base station is a base station currently serving the terminal device, and the obtaining, by a base station, a first security configuration message includes:

when the terminal device needs to be handed over to a target base station, receiving, by the base station, the first security configuration message sent by the target base station.

In this embodiment, continuity of the security configuration can still be ensured after the terminal device is handed over.

In a possible embodiment, the N radio bearers are set up on one or more of the following protocol layers: a Packet Data Convergence Protocol (PDCP) layer, a Radio Link Control (RLC) layer, and a Media Access Control (MAC) layer.

In this embodiment, a security configuration parameter can still be configured in a simplified protocol stack model, for example, in a protocol stack in which a PDCP layer is not configured.

In a possible embodiment, in a scenario in which a user plane and a control plane are separated, the first security configuration message may indicate a security configuration parameter for a radio bearer only in the control plane in the M radio bearers, and may not indicate a security configuration parameter for a radio bearer in the user plane in the M radio bearers.

In this embodiment, it is ensured that different bearers may have different security configuration, that is, flexibility of service security configuration is ensured. In addition, for some services in which a security configuration parameter does not need to be configured, signaling overheads are reduced.

In a possible embodiment, the bearer list further includes a quality of service (QoS) parameter.

In a possible embodiment, the radio bearers are classified in the bearer list based on the security configuration parameters.

In this embodiment, the communications resource can be further saved to prevent redundancy.

An embodiment of the present disclosure provides a security configuration method for a radio bearer, including:

receiving, by a terminal device, a first security configuration message sent by a base station, where the first security configuration message is used to indicate whether security configuration needs to be performed on each of N radio bearers set up between the base station and the terminal device, and indicate security configuration parameters for M radio bearers on which security configuration needs to be performed, where N is a positive integer, M is an integer, and M≤N; and configuring, by the terminal device, the security configuration parameters for the M radio bearers by using the first security configuration message.

In this embodiment, the security configuration parameter may be separately configured for the bearer of the terminal device. Therefore, applicability of security configuration can be improved.

In a possible embodiment, the first security configuration message includes a first bearer list, where the first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

In this embodiment, the default security configuration parameter is used, so that there is no need to transmit a security configuration parameter. Therefore, a communications resource can be saved. In addition, when the bearer list includes the bearer identifiers of the M radio bearers and the security configuration parameter of each of the M radio bearers, that is, includes only the bearer identifiers and the security configuration parameters on which security configuration needs to be performed, the communications resource can be saved.

In a possible embodiment, the security configuration parameter includes one or more of the following parameters: an integrity protection parameter and an encryption parameter.

In a possible embodiment, the method further includes:

reporting, by the terminal device, security capability information to a management entity, where the first security configuration message is generated by the base station based on a second security configuration message and a context of the terminal device, and the second security configuration message is received by the base station and sent by the management entity, and is generated by the management entity based on the security capability information to be used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M.

In this embodiment, the second security configuration message is generated based on a security capability information reported by the terminal device, so as to avoid a resource waste due to that the configured second security configuration message is not supported by the terminal device.

In a possible embodiment, the configuring, by the terminal device, the security configuration parameters for the M radio bearers by using the first security configuration message includes:

configuring, by the terminal device, the security configuration parameters for the M radio bearers on a PDCP layer, an RLC layer, or a MAC layer.

An embodiment of the present disclosure provides a security configuration method for a radio bearer, including:

sending, by a management entity, a second security configuration message to a base station, where the second security configuration message is used to indicate whether security configuration needs to be performed on each of L radio bearers corresponding to the management entity, and indicate security configuration parameters for K radio bearers on which security configuration needs to be performed, and is used to indicate whether security configuration needs to be performed on each of N radio bearers set up between the base station and the terminal device, and indicate security configuration parameters for M radio bearers on which security configuration needs to be performed, where N is a positive integer, M is an integer, M≤N, L is a positive integer greater than or equal to N, and K is an integer greater than or equal to M.

In this embodiment, the security configuration parameter may be separately configured for the bearer of the terminal device. Therefore, applicability of security configuration can be improved.

In a possible embodiment, the method further includes:

receiving, by the management entity, security capability information reported by the terminal device, and generating the second security configuration message based on the security capability information; or generating, by the management entity, the second security configuration message based on channel quality or a service parameter of the terminal device.

In this embodiment, the second security configuration message is generated based on a security capability information reported by the terminal device, so as to avoid a resource waste due to that the configured second security configuration message is not supported by the terminal device.

In a possible embodiment, the second security configuration message includes a second bearer list, where the second bearer list includes bearer identifiers and indication information of the L radio bearers and the security configuration parameters of the K radio bearers on which security configuration needs to be performed, and the indication information is used to indicate whether a security configuration parameter needs to be configured for a corresponding radio bearer; or the second bearer list includes bearer identifiers and indication information of the L radio bearers, the indication information is used to indicate whether a security configuration parameter needs to be configured for a corresponding radio bearer, and the security configuration parameters indicated in the second security configuration message that are configured for the K radio bearers are default security configuration parameters pre-obtained by the terminal device; or the second bearer list includes bearer identifiers of the L radio bearers and the security configuration parameter of each of the K radio bearers.

In this embodiment, the default security configuration parameter is used, so that there is no need to transmit a security configuration parameter. Therefore, a communications resource can be saved. In addition, when the bearer list includes the bearer identifiers of the M radio bearers and the security configuration parameter of each of the M radio bearers, that is, includes only the bearer identifiers and the security configuration parameters on which security configuration needs to be performed, the communications resource can be saved.

In a possible embodiment, the security configuration parameter includes one or more of the following parameters: an integrity protection parameter and an encryption parameter.

In a possible embodiment, the L radio bearers are set up on one or more of the following protocol layers: a PDCP layer, an RLC layer, and a MAC layer.

An embodiment of the present disclosure provides a base station. The base station is configured to implement the functions of the base station in the method design of the embodiments of the present disclosure, the functions are implemented by hardware/software, and the hardware/software of the base station includes units corresponding to the foregoing functions.

An embodiment of the present disclosure provides a terminal device. The terminal device is configured to implement the functions of the terminal device in the method design of the embodiments of the present disclosure, the functions are implemented by hardware/software, and the hardware/software of the terminal device includes units corresponding to the foregoing functions.

An embodiment of the present disclosure provides a management entity. The management entity is configured to implement the functions of the management entity in the method design of the embodiments of the present disclosure, the functions are implemented by hardware/software, and the hardware/software of the management entity includes units corresponding to the foregoing functions.

An embodiment of the present disclosure provides a base station, including: a processor, a receiver, a transmitter, and a memory. The processor executes a program stored in the memory to implement the method implemented by the base station in the method design of the embodiments of the present disclosure.

An embodiment of the present disclosure provides a terminal device, including: a processor, a receiver, a transmitter, and a memory. The processor executes a program stored in the memory to implement the method implemented by the terminal device in the method design of the embodiments of the present disclosure.

An embodiment of the present disclosure provides a management entity, including: a processor, a receiver, a transmitter, and a memory. The processor executes a program stored in the memory to implement the method implemented by the management entity in the method design of the embodiments of the present disclosure.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
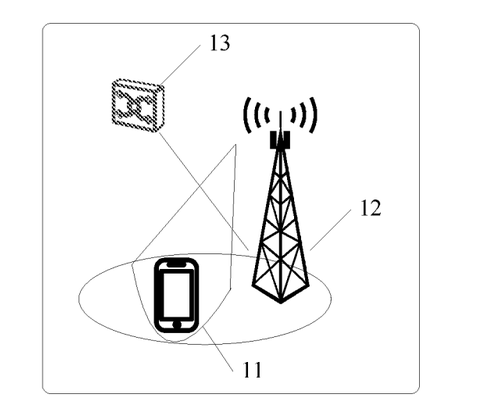
FIG. 1 is a diagram of a system architecture to which a security configuration method may be applied according to an embodiment of the present disclosure.

Referring to FIG. 1, FIG. 1 is a diagram of a system architecture to which a security configuration method may be applied according to an embodiment of the present disclosure. As shown in FIG. 1, the system architecture includes: a terminal device 11, a base station 12, and a management entity 13. The terminal device 11 may access a network by using the base station 12. The management entity 13 may configure a security configuration message of a carrier for the terminal device 11 by using the base station 12, or the base station 12 may configure a security configuration message for the terminal device 11 without participation of the management entity 13. For a specific application scenario of the system architecture, refer to descriptions in the following embodiments. The terminal device 11 may be a user-side network device such as a computer, a mobile phone, a tablet computer, a notebook computer, a wearable device, and a smart television. In addition, the foregoing system architecture may be applied to a system such as a Long Term Evolution (LTE) system, a Universal Mobile Telecommunications System (UMTS), or a Global System for Mobile communications (GSM). The base station 12 may be any base station, for example, an evolved NodeB (eNB) or a conventional base station, in the foregoing system. The foregoing management entity may also be any management entity on a core side in the foregoing system, such as a mobility management entity (MME) in the LTE system or a serving GPRS support node (SGSN) in the UMTS system.

In addition, a radio bearer set up by a terminal device in the embodiments of the present disclosure may be a network-side-oriented bearer set up by the terminal device. For example, the bearer set up by the terminal device may include a radio bearer (RB) or data radio bearer (DRB) set up between the terminal device and a base station. Alternatively, the bearer set up by the terminal device may include a radio access bearer (RAB), for example, an evolved radio access bearer (E-RAB), set up between the terminal device and a management entity.

Figure 2:
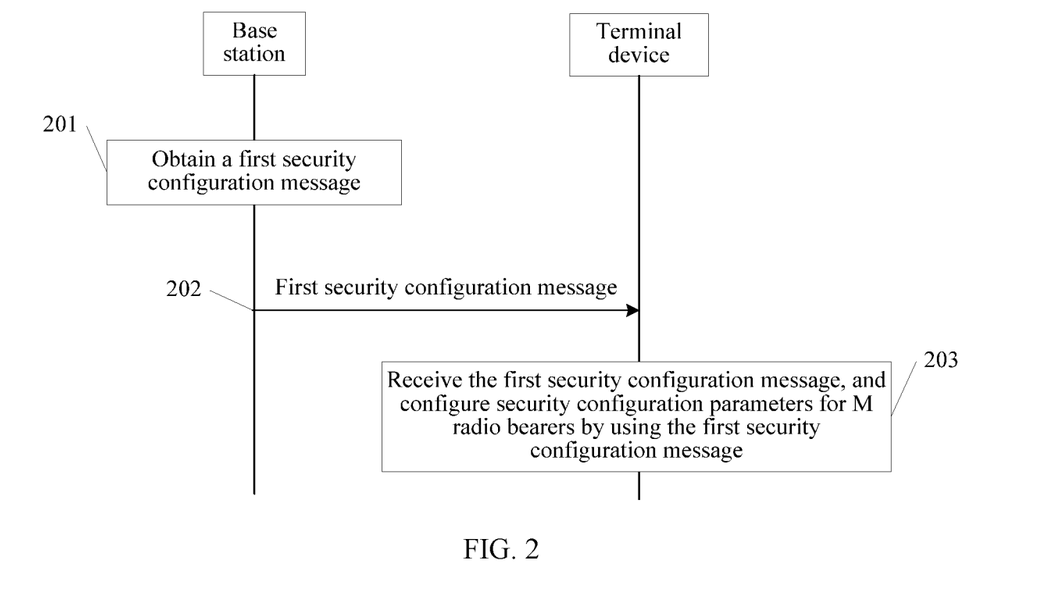
FIG. 2 is a schematic flowchart of a security configuration method for a radio bearer according to an embodiment of the present disclosure.

Referring to FIG. 2, FIG. 2 is a schematic flowchart of a security configuration method for a radio bearer according to an embodiment of the present disclosure. As shown in FIG. 2, the method includes the following steps.

201: A base station obtains a first security configuration message, where the first security configuration message is used to indicate whether security configuration needs to be performed on each of N radio bearers set up between the base station and a terminal device, and indicate security configuration parameters for M radio bearers on which security configuration needs to be performed, where N is a positive integer, M is an integer, and M≤N.

The N radio bearers may be all or some bearers set up between the base station and the terminal device. In the N radio bearers, the security configuration parameters need to be configured for the M radio bearers. In other words, security configuration parameters do not need to be configured for N−M bearers. Because M is an integer less than or equal to N, when M is 0, it indicates that security configuration parameters do not need to be configured for all the N radio bearers set up between the base station and the terminal device.

Optionally, the security configuration parameter may include one or more of the following parameters: for example, an integrity protection parameter and an encryption parameter.

Optionally, the base station may reconfigure the security configuration parameter based on an actual network status, for example, a channel status or a network load status, of the terminal device.

Optionally, the terminal device may represent one specific terminal device. Certainly, in some scenarios, the terminal device may alternatively represent a plurality of terminal devices. In this way, when there is a same radio bearer in radio bearers used by the plurality of terminal devices, security configuration may be performed on the radio bearers of the plurality of terminal devices by using the first security configuration message. For example, if a terminal device 1 and a terminal device 2 both use an email service and a payment data service, in this embodiment, integrity protection security configuration may be performed, by using the first security configuration message, on radio bearers of the terminal device 1 and the terminal device 2 for transmitting the email service, and encryption security configuration may be performed, by using the first security configuration message, on radio bearers of the terminal device 1 and the terminal device 2 for transmitting the payment data service.

202: The base station sends the first security configuration message to the terminal device.

Optionally, the base station may send the first security configuration message to the terminal device by using Radio Resource Control (RRC) connection reconfiguration signaling.

Optionally, the base station may send the first security configuration message to the terminal device by using a security mode command.

203: The terminal device receives the first security configuration message sent by the base station, and configures the security configuration parameters for the M radio bearers by using the first security configuration message.

Optionally, the terminal device obtains a bearer list from the first security configuration message, determines, based on the bearer list, whether security configuration needs to be performed on each of the N radio bearers, and performs security configuration based on a requirement of the security configuration parameters.

In this embodiment, the security configuration parameter may be separately configured for the bearer of the terminal device. Therefore, applicability of security configuration can be improved, and a communications resource can be saved. For example, when a service transmitted on a radio bearer is a service having a relatively high integrity requirement, for example, when an email service is transmitted, integrity protection security configuration may be performed on the radio bearer. For example, when a service transmitted on a radio bearer is a service having a relatively high security requirement, for example, when a payment data service or a voice service is transmitted, encryption security configuration may be performed on the radio bearer.

In addition, in this embodiment, in a scenario in which a user plane and a control plane are separated, the first security configuration message may indicate a security configuration parameter for a radio bearer only in the control plane in the M radio bearers, and may not indicate a security configuration parameter for a radio bearer in the user plane in the M radio bearers, that is, the terminal device may configure a security configuration parameter for a radio bearer only in the control plane in the M radio bearers. Certainly, in some particular scenarios, the first security configuration message may indicate configuration parameters for radio bearers in both the user plane and the control plane in the M radio bearers. That is, the terminal device may configure security configuration parameters for radio bearers in both the user plane and the control plane in the M radio bearers. In addition, the user plane may be used to transmit service data of the terminal device, and the control plane may be used to manage the user plane, generate control signaling, and the like. The radio bearer in the user plane may be understood as a radio bearer for transmitting service data, and the radio bearer in the control plane may be understood as a radio bearer for transmitting control signaling. In this way, it is ensured that different bearers may have different security configuration, that is, flexibility of service security configuration is ensured. In addition, for some services in which a security configuration parameter does not need to be configured, signaling overheads are reduced.

In step 201, optionally, the first security configuration message may include a first bearer list. In different cases, the first bearer list may include different parameters.

In a first case, the first bearer list includes parameters related to the N radio bearers. For example, the first bearer list includes bearer identifiers of the N radio bearers, indication information of the N radio bearers, and the security configuration parameters of the M radio bearers. The radio bearer identifiers and the N radio bearers are in a one-to-one correspondence, that is, each bearer identifier, for example, RB identifier (RB ID) information, may identify one of the N radio bearers. The indication information of the radio bearer may be used to indicate whether a security configuration parameter needs to be configured for a corresponding radio bearer.

In a bearer list shown in Table 1, an RB ID represents a bearer identifier of a radio bearer, and indication information indicates whether a security configuration parameter needs to be configured for a corresponding radio bearer.

TABLE 1

| Bearer identifier (RB ID) | Indication information | Security configuration parameter |
| --- | --- | --- |
| RB ID: 0 | Configuration required | Security configuration parameter A |
| RB ID: 1 | Configuration not required | — |
| RB ID: 2 | Configuration required | Security configuration parameter A |
| . . . | . . . | . . . |
| RB ID: N-1 | Configuration required | Security configuration parameter B |

Optionally, the first bearer list may further include a quality of service (Quality of Service, QoS) parameter, for example, an E-RAB-level QoS parameter. Optionally, the first bearer list may further include configuration parameters, for example, information such as a quantity of times of retransmission and a data packet format, on a PDCP layer, an RLC layer, and a MAC layer, and the like. Each radio bearer may further include a corresponding security configuration parameter. In this way, a QoS parameter of a corresponding bearer may be determined by using bearer identifier information, for example, as shown in a bearer list shown in Table 2.

TABLE 2

| Radio bearer identifier (RB ID) | Indication information | | | Security configuration parameter |
| --- | --- | --- | --- | --- |
| RB ID: 0 | Configuration required | QoS parameter | PDCP, RLC, and MAC configuration parameters | Security configuration parameter A |
| RB ID: 1 | Configuration not required | QoS parameter | PDCP, RLC, and MAC configuration parameters | — |
| RB ID: 2 | Configuration required | QoS parameter | PDCP, RLC, and MAC configuration parameters | Security configuration parameter A |
| . . . | . . . | . . . | . . . | . . . |
| RB ID: N-1 | Configuration required | QoS parameter | PDCP, RLC, and MAC configuration parameters | Security configuration parameter |

Optionally, to save the communications resource, a default security configuration parameter of each radio bearer in the first bearer list may be set. When the indication information indicates that security configuration needs to be performed on a radio bearer, the security configuration is performed on the radio bearer by using a default security configuration parameter. The terminal device may be notified by the base station of the default security configuration parameter in advance. In this case, a QoS parameter may also be included in the bearer list. Optionally, the first bearer list may further include configuration parameters, for example, information such as a quantity of times of retransmission and a data packet format, on a PDCP layer, an RLC layer, and a MAC layer, and the like, as shown in a bearer list shown in Table 3.

TABLE 3

| Radio bearer identifier (RB ID) | Indication information | | |
| --- | --- | --- | --- |
| RB ID: 0 | Configuration required | QoS parameter (optional) | PDCP, RLC, and MAC configuration parameters (optional) |
| RB ID: 1 | Configuration not required | QoS parameter (optional) | PDCP, RLC, and MAC configuration parameters (optional) |
| RB ID: 2 | Configuration required | QoS parameter (optional) | PDCP, RLC, and MAC configuration parameters (optional) |
| . . . | . . . | . . . | . . . |
| RB ID: N-1 | Configuration required | QoS parameter (optional) | PDCP, RLC, and MAC configuration parameters (optional) |

In a second case, the first bearer list may include only parameters related to the M radio bearers for which the security configuration parameters need to be configured. For example, the first bearer list includes bearer identifiers of the M radio bearers and the security configuration parameter of each of the M radio bearers, as shown in Table 4.

TABLE 4

| Bearer identifier (RB ID) | Security configuration parameter |
| --- | --- |
| RB ID: 0 | Security configuration parameter: A |
| RB ID: 2 | Security configuration parameter: A |
| . . . | . . . |
| RB ID: N-1 | Security configuration parameter: B |

A bearer on which security configuration does not need to be performed and whose RB ID is 1 is not included in the bearer list. In other words, the first bearer list includes only the M radio bearers on which security configuration needs to be performed and whose bearer identifiers are 0, 2, ..., and N−1.

Optionally, the first bearer list may further include a QoS parameter, for example, an E-RAB-level QoS parameter. Optionally, the first bearer list may further include configuration parameters, for example, information such as a quantity of times of retransmission and a data packet format, on a PDCP layer, an RLC layer, and a MAC layer, and the like, for example, as shown in a bearer list shown in Table 5.

TABLE 5

| Bearer identifier (RB ID) | | | Security configuration parameter |
|---|---|---|---|
| RB ID: 0 | QoS parameter | PDCP, RLC, and MAC configuration parameters | Security configuration parameter: A |
| RB ID: 2 | QoS parameter | PDCP, RLC, and MAC configuration parameters | Security configuration parameter: A |
| ... | ... | ... | ... |
| RB ID: N-1 | QoS parameter | PDCP, RLC, and MAC configuration parameters | Security configuration parameter: B |

Optionally, to further save the communications resource to prevent redundancy, the radio bearers may be classified based on the security configuration parameters. That is, radio bearers having a same security configuration parameter are classified into one class, as shown in a first bearer list shown in Table 6.

TABLE 6

| Security configuration parameter | Bearer identifier (RB ID) |
|---|---|
| Security configuration parameter: A | RB ID: 0; RB ID: 2; ... |
| Security configuration parameter: B | RB ID: N-1; ... |
| ... | ... |

In conclusion, the first bearer list may include the bearer identifiers of the N radio bearers and the indication information of the N radio bearers. Alternatively, the first bearer list may include the bearer identifiers of the M radio bearers and the security configuration parameter of each of the M radio bearers.

Optionally, the security configuration parameter may include one or more of the following parameters: for example, an integrity protection parameter and an encryption parameter. Alternatively, it may be understood as that the security configuration parameter includes a security algorithm, and the security algorithm may be an encryption algorithm, an integrity protection algorithm, and the like.

The integrity protection parameter is a parameter for protecting data integrity. Data integrity is one of three basic points of information security, and means that in a process of transmitting and storing information or data, it is ensured that the information or data is not tampered without permission or tampering of the information or data can be quickly found. For example, when a data service transmitted on a bearer is a service having a relatively high integrity requirement, for example, when an email service is transmitted, integrity protection security configuration may be performed on the bearer.

In addition, when being transmitted, data may be encrypted by using the encryption parameter. A basic process of data encryption is processing, based on an algorithm, a file or data that is originally plaintext, so that the file or data becomes an unreadable segment of code, the segment of code is usually referred to as "ciphertext", and original content is not displayed until a corresponding key is input. According to this approach, data is prevented from being thieved and read by an unauthorized person. For example, when a data service transmitted on a bearer is a service having a relatively high security requirement, for example, when a payment data service or a voice service is transmitted, encryption security configuration and the like may be performed on the bearer. This is not listed one by one herein.

Optionally, the first security configuration message may be used to perform security configuration on the M radio bearers on a PDCP layer, an RLC layer, or a MAC layer, that is, the N radio bearers may be set up on one or more of the following protocol layers: a PDCP layer, an RLC layer, and a MAC layer.

In step 202, optionally, the first security configuration message may be DRB configuration signaling, for example, an RRC connection reconfiguration message.

Optionally, the first security configuration message sent by the base station to the terminal device may be a security mode command. The base station sends the security mode command to the terminal device. After receiving the command, the terminal device returns a security mode complete message to the base station. In addition, the security mode command may include the bearer list.

In step 203, optionally, the terminal device may configure the M radio bearers when performing security configuration on the PDCP layer, the RLC layer, or the MAC layer. For example, using the PDCP layer as an example, the security configuration parameter may be added to a PDCP parameter in the first security configuration message. In this way, the terminal device may perform security configuration on the PDCP layer by using the security configuration parameter during configuration on the PDCP layer.

In addition, for security configuration on the RLC layer and the MAC layer, the security configuration parameter may also be added to an RLC parameter or a MAC parameter in the first security configuration message, so that the terminal device performs security configuration on the RLC layer and the MAC layer.

In this way, the security configuration parameter can still be configured in a simplified protocol stack model, for example, in a protocol stack in which a PDCP layer is not configured.

Figure 3:
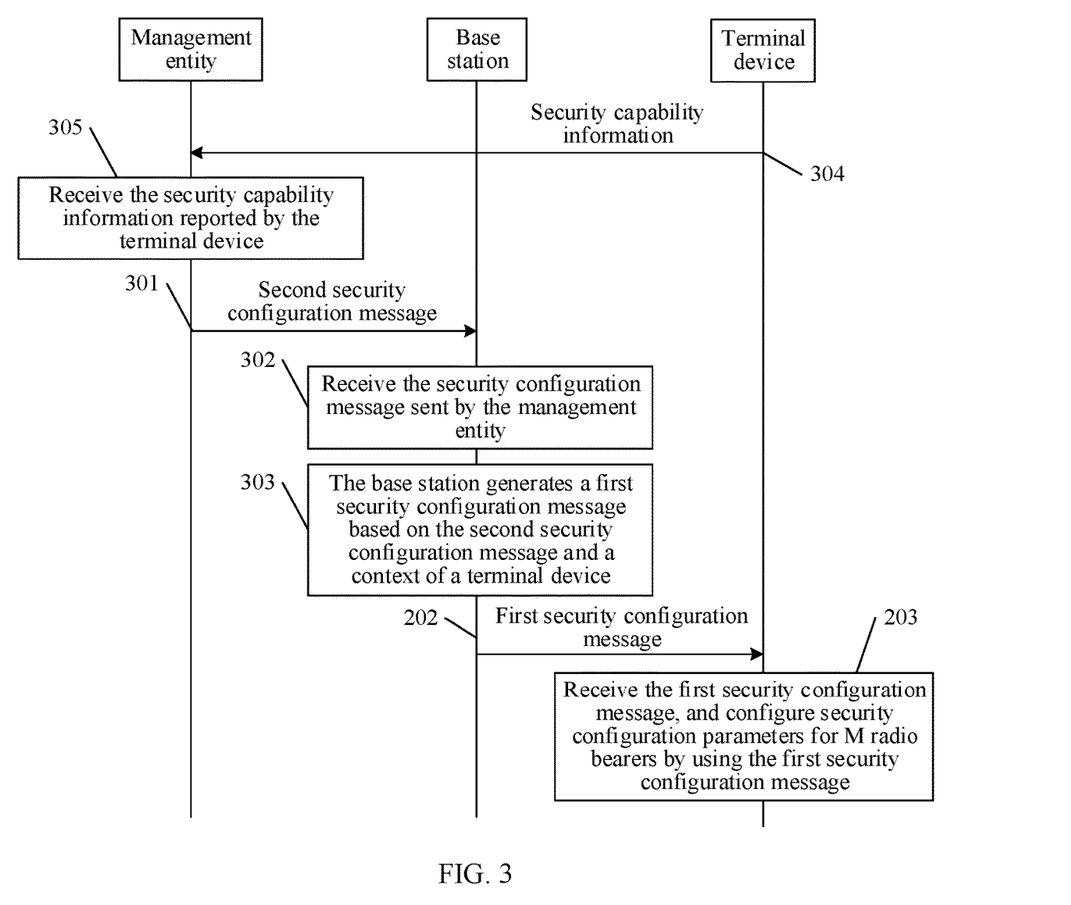
FIG. 3 is a schematic flowchart of another security configuration method for a radio bearer according to an embodiment of the present disclosure.

Referring to FIG. 3, FIG. 3 is a schematic flowchart of another security configuration method for a radio bearer according to an embodiment of the present disclosure. As shown in FIG. 3, that the base station obtains the first security configuration message in step 201 in FIG. 2 may include the following steps, and remaining steps are the same as those in the embodiment in FIG. 2.

Step 301: A management entity sends a second security configuration message to the base station, where the second security configuration message is used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M.

Step 302: The base station receives the second security configuration message sent by the management entity.

Optionally, the second security configuration message includes a second bearer list, and the second bearer list includes bearer identifiers of the L radio bearers related to the management entity and corresponding security configuration parameters. Radio bearers related to a management entity may be understood as all or some radio bearers set up between a base station controlled by the management entity and a terminal device corresponding to each base station.

For example, the second security configuration message may include the second bearer list.

The second bearer list includes bearer identifiers and indication information of the L radio bearers and the security configuration parameters of the K radio bearers on which security configuration needs to be performed, and the indication information is used to indicate whether a security configuration parameter needs to be configured for a corresponding radio bearer; or the second bearer list includes bearer identifiers and indication information of the L radio bearers, the indication information is used to indicate whether a security configuration parameter needs to be configured for a corresponding radio bearer, and the security configuration parameters indicated in the second security configuration message that are configured for the K radio bearers are default security configuration parameters pre-obtained by the terminal device; or the second bearer list includes bearer identifiers of the L radio bearers and the security configuration parameter of each of the K radio bearers.

The second bearer list may be similar to the first bearer list described in the embodiment shown in FIG. 2. The N radio bearers in the first bearer list may correspond to the L radio bearers in the second bearer list. The M radio bearers in the first bearer list may correspond to the K radio bearers in the second bearer list. That is, the six list forms of the first bearer list are also applicable to the second bearer list, and details are not described herein again.

Step 303: The base station generates the first security configuration message based on the second security configuration message and a context of a terminal device.

Optionally, after the base station receives the second security configuration message, for a terminal device, the base station determines, based on a context of the terminal device, N radio bearers related to the terminal device. For example, the base station may select the N radio bearers from the L radio bearers in the second bearer list, finds the M radio bearers for which security parameters need to be configured in the N radio bearers, and further establishes the first bearer list in a first security configuration message based on each security configuration parameter, QoS parameter, and the like that match each radio bearer.

Optionally, in step 301, the second security configuration message may be configured and generated by the management entity for the terminal device. For example, before step 301, the method may further include the following steps.

Step 304: The terminal device reports security capability information to the management entity.

Step 305: The management entity receives the security capability information reported by the terminal device.

The second security configuration message is generated based on the security capability information to indicate whether security configuration needs to be performed on each of the L radio bearers corresponding to the management entity, and indicate the security configuration parameters for the K radio bearers on which security configuration needs to be performed. That is, the security capability information may enable the management entity to generate, based on the security capability information, the second security configuration message used to perform security configuration on the K radio bearers.

The security capability information may indicate a security configuration mode or security configuration parameter supported by the terminal device. In this way, the security configuration parameter included in the second security configuration message may be the security configuration parameter supported by the terminal device, or a security mode configured in the second security configuration message is the security configuration mode supported by the terminal device. Therefore, a resource waste due to that the configured second security configuration message is not supported by the terminal device can be avoided.

Alternatively, the management entity may generate the second security configuration message based on channel quality, a service parameter of the terminal device, or the like.

It should be noted herein that because the management entity belongs to a core network, a message transmitted between the management entity and the base station is a higher-layer protocol message, and a message previously transmitted between the base station and the terminal device is a previous transmission protocol message between the base station and the terminal device. Therefore, when receiving the second security configuration message, the base station may generate the terminal-device-oriented first security configuration message based on the security configuration message. For example, the base station may perform protocol conversion on the second security configuration message to generate the first security configuration message. In addition, alternatively, after receiving the second security configuration message, the base station may add message content to the second security configuration message or adjust message content in the second security configuration message, to generate the first security configuration message. For another example, the second security configuration message may be used only to perform security configuration on the K radio bearers of the terminal device, but is not limited to being used only to perform security configuration on the radio bearers of the terminal device. Therefore, the base station may generate, based on the second security configuration message, the first security configuration message used only to perform security configuration on the M radio bearers of the terminal device.

Optionally, before step 301, after receiving an initial context setup request message, the base station may further return an initial context setup response message to the management entity, to indicate that the initial context setup request message has been received.

Optionally, the security configuration message sent by the management entity to the base station may be an E-RAB setup request. The management entity sends the E-RAB setup request to the base station. After receiving the request, the base station may return an E-RAB setup response to the management entity, so that the management entity sends the security configuration message to the base station.

Optionally, the L radio bearers are set up on one or more of the following protocol layers: a PDCP layer, an RLC layer, and a MAC layer. For an implementation of setting up the L radio bearers on the PDCP layer, the RLC layer, and the MAC layer, refer to the implementation of configuring the security configuration parameter for the radio bearer in the N radio bearers on the PDCP layer, the RLC layer, and the MAC layer in the embodiment shown in FIG. 2.

Security configuration parameters in the present disclosure may be correspondingly distinguished based on services. For example, integrity protection security configuration may be performed for an email service, and encryption security configuration may be performed for a payment data service or a voice service. Targeted matching between a security configuration parameter and a service feature is more easily performed in the management entity. Therefore, precision of the security configuration parameter configured by the terminal device for the radio bearer may be higher by using the second security configuration message sent by the management entity.

Figure 4:
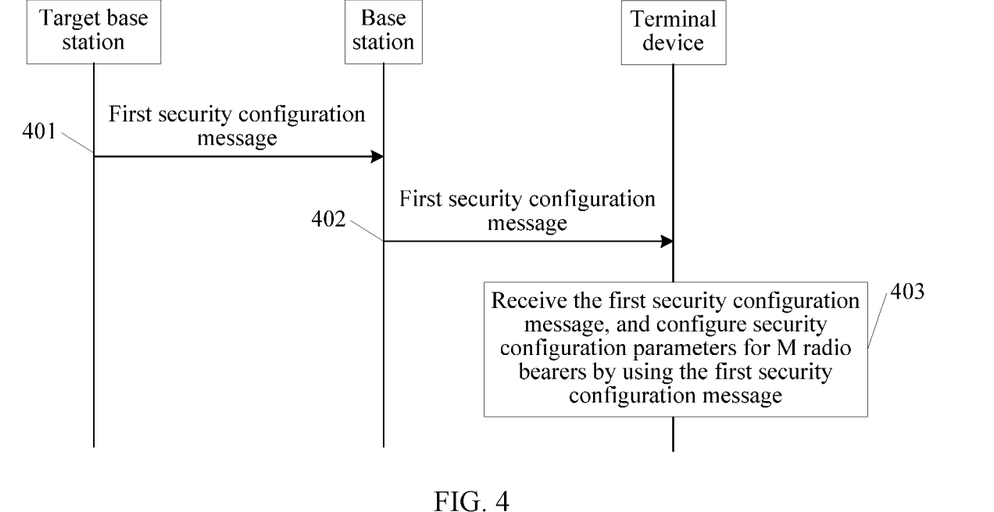
FIG. 4 is a schematic flowchart of another security configuration method for a radio bearer according to an embodiment of the present disclosure.

Referring to FIG. 4, FIG. 4 is a schematic flowchart of another security configuration method for a radio bearer according to an embodiment of the present disclosure. As shown in FIG. 4, the method includes the following steps.

401: When a terminal device needs to be handed over to a target base station, a base station receives a first security configuration message that is sent by the target base station and that is used to perform security configuration on M radio bearers set up by the terminal device.

The base station may be understood as a base station currently connected to the terminal device, or may be understood as a base station currently serving the terminal device. When needing to be handed over to the target base station, the terminal device may receive the first security configuration message sent by the target base station. The first security configuration message sent by the target base station may be configured and generated by the target base station. For details, refer to the manner of generating the security configuration message by the base station described in the embodiment shown in FIG. 2. Alternatively, the first security configuration message may be generated by the target base station based on the second security configuration message sent by the management entity. For details, refer to the manner of generating the first security configuration message by the base station in the embodiment shown in FIG. 3.

In addition, when the terminal device needs to be handed over to the target base station, the base station may further send, to the target base station, a request message indicating that the terminal device is to be handed over to the target base station. After receiving an acknowledgment message (for example, an ACK message) returned by the target base station, the base station further sends, to the terminal device, a notification message for being handed over to the target base station. The terminal device returns an acknowledgment message (for example, an ACK message) of the notification message to the base station. After receiving the acknowledgment message returned by the terminal device, the base station may perform step 401.

402: The base station sends the first security configuration message to the terminal device.

Optionally, the base station sends the first security configuration message to the terminal device by using RRC connection reconfiguration signaling.

403: The terminal device receives the first security configuration message sent by the base station, and configures security configuration parameters for the M radio bearers by using the first security configuration message.

For an implementation of configuring the security configuration parameters in step 403, specifically, refer to the implementation of configuring the security configuration parameters for the M radio bearers by the terminal device in the embodiment shown in FIG. 2.

In this embodiment, a plurality of optional implementations are added based on the embodiment shown in FIG. 2, all can improve applicability of security configuration, and can still ensure continuity of the security configuration after the terminal device is handed over.

Figure 5:
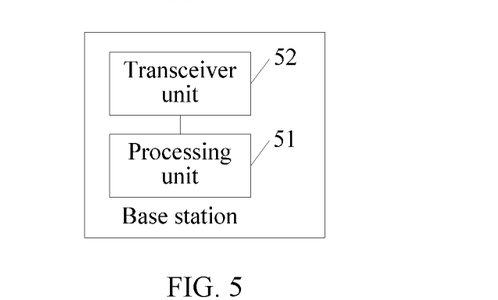
FIG. 5 is a schematic structural diagram of a base station according to an embodiment of the present disclosure.

Referring to FIG. 5, FIG. 5 is a schematic structural diagram of a base station according to an embodiment of the present disclosure. As shown in FIG. 5, the base station includes: a processing unit 51 and a transceiver unit 52.

The processing unit 51 is configured to obtain a first security configuration message, where the first security configuration message is used to indicate whether security configuration needs to be performed on each of N radio bearers set up between the base station and a terminal device, and indicate security configuration parameters for M radio bearers on which security configuration needs to be performed, where N is a positive integer, M is an integer, and M≤N.

In this embodiment, for both the first security configuration message obtained by the processing unit 51 and an implementation of obtaining the first security configuration message, refer to step 201 in the embodiment shown in FIG. 2.

The transceiver unit 52 is configured to send the first security configuration message to the terminal device.

In this embodiment, for an implementation of sending the first security configuration message by the transceiver unit 52, refer to step 202 in the embodiment shown in FIG. 2.

Optionally, the first security configuration message may include a first bearer list.

The first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

For an implementation of the bearer list in this implementation, refer to the implementation of the bearer list in the embodiment shown in FIG. 2.

Optionally, the security configuration parameter includes one or more of the following parameters: an integrity protection parameter and an encryption parameter.

For implementations of the integrity protection parameter and the encryption parameter in this implementation, refer to the implementations of the integrity protection parameter and the encryption parameter in the embodiment shown in FIG. 2.

Optionally, the transceiver unit 52 may further be configured to receive a second security configuration message sent by a management entity, where the second security configuration message is used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M.

The processing unit 52 may be configured to generate the first security configuration message based on the second security configuration message and a context of the terminal device.

For an implementation in this implementation, refer to the descriptions of step 302 and step 303 in the embodiment shown in FIG. 3.

Optionally, the base station is a base station currently serving the terminal device. The processing unit 51 may be configured to: when the terminal device needs to be handed over to a target base station, receive, by using the transceiver unit, the first security configuration message sent by the target base station.

For an implementation in this implementation, refer to the description of step 401 in the embodiment shown in FIG. 4.

Optionally, the N radio bearers may be set up on one or more of the following protocol layers: a PDCP layer, an RLC layer, and a MAC layer.

For this implementation, refer to the implementation of performing security configuration on the radio bearer on the PDCP layer, the RLC layer, and the MAC layer in the embodiment shown in FIG. 2.

In this embodiment, the security configuration parameter may be separately configured for the bearer of the terminal device. Therefore, applicability of security configuration can be improved, and a communications resource can be saved.

Figure 6:
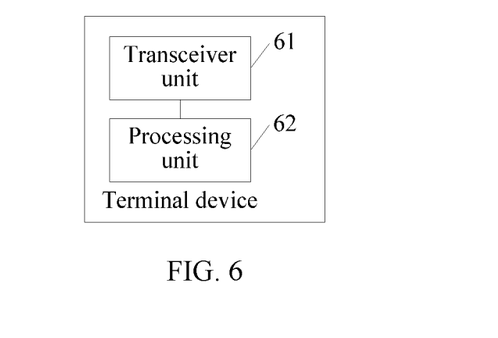
FIG. 6 is a schematic structural diagram of a terminal device according to an embodiment of the present disclosure.

Referring to FIG. 6, FIG. 6 is a schematic structural diagram of a terminal device according to an embodiment of the present disclosure. As shown in FIG. 6, the terminal device includes: a transceiver unit 61 and a processing unit 62.

The transceiver unit 61 is configured to receive a first security configuration message sent by a base station, where the first security configuration message is used to indicate whether security configuration needs to be performed on each of N radio bearers set up between the base station and the terminal device, and indicate security configuration parameters for M radio bearers on which security configuration needs to be performed, where N is a positive integer, M is an integer, and M≤N.

The processing unit 62 is configured to configure the security configuration parameters for the M radio bearers by using the first security configuration message.

In this embodiment, for an implementation of configuring the security configuration parameters for the M radio bearers by the processing unit 62, refer to the implementation of step 203 in the embodiment shown in FIG. 2.

Optionally, the first security configuration message may include a first bearer list.

The first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

For the first bearer list and an implementation of configuring the security configuration parameters for the M radio bearers by the processing unit 62 by using the bearer list in this implementation, respectively refer to the implementation of the first bearer list and the implementation of configuring the security configuration parameters for the M radio bearers by using the bearer list in the embodiment shown in FIG. 2.

Optionally, the security configuration parameter may include one or more of the following parameters: an integrity protection parameter and an encryption parameter.

For implementations of the integrity protection parameter and the encryption parameter in this implementation, refer to the implementations of the integrity protection parameter and the encryption parameter in the embodiment shown in FIG. 2.

Optionally, the transceiver unit 61 may further be configured to report security capability information to a management entity, where the first security configuration message is generated by the base station based on a second security configuration message and a context of the terminal device, and the second security configuration message is received by the base station and sent by the management entity, and is generated by the management entity based on the security capability information to be used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M.

In this implementation, for an implementation of the transceiver unit 61 and an implementation of the security capability information, refer to the implementation of step 305 in the embodiment shown in FIG. 3.

Optionally, the processing unit 62 may be configured to configure the security configuration parameters for the M radio bearers on a PDCP layer, an RLC layer, or a MAC layer.

For this implementation, refer to the implementation of performing security configuration on the radio bearer by the terminal device on the PDCP layer, the RLC layer, and the MAC layer in the embodiment shown in FIG. 2.

In this embodiment, the security configuration parameter may be separately configured for the bearer of the terminal device. Therefore, applicability of security configuration can be improved, and a communications resource can be saved.

Figure 7:
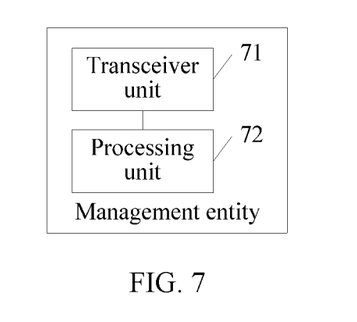
FIG. 7 is a schematic structural diagram of a management entity according to an embodiment of the present disclosure.

Referring to FIG. 7, FIG. 7 is a schematic structural diagram of a management entity according to an embodiment of the present disclosure. As shown in FIG. 7, the management entity includes a transceiver unit 71.

The transceiver unit 71 is configured to send a second security configuration message to a base station, where the second security configuration message is used to indicate whether security configuration needs to be performed on each of L radio bearers corresponding to the management entity, and indicate security configuration parameters for K radio bearers on which security configuration needs to be performed, and is used to enable the base station to generate a first security configuration message based on the second security configuration message and a context of a terminal device, and the first security configuration message is used to indicate whether security configuration needs to be performed on each of N radio bearers set up between the base station and the terminal device, and indicate security configuration parameters for M radio bearers on which security configuration needs to be performed, where N is a positive integer, M is an integer, M≤N, L is a positive integer greater than or equal to N, and K is an integer greater than or equal to M.

In this embodiment, for an implementation of sending the second security configuration message by the transceiver unit 71, refer to the implementation of step 301 in the embodiment shown in FIG. 3.

Optionally, the management entity may further include:

a processing unit 72, configured to generate the second security configuration message based on channel quality or a service parameter of the terminal device.

Alternatively, the transceiver unit 71 is further configured to receive security capability information reported by the terminal device, and the management entity further includes:

a processing unit 72, configured to generate the second security configuration message based on the security capability information.

In this implementation, for an implementation of generating the second security configuration message, refer to the implementation of generating the second security configuration message by the management entity in the embodiment shown in FIG. 3.

Optionally, the second security configuration message may include a second bearer list.

The second bearer list includes bearer identifiers and indication information of the L radio bearers and the security configuration parameters of the K radio bearers on which security configuration needs to be performed, and the indication information is used to indicate whether a security configuration parameter needs to be configured for a corresponding radio bearer; or the second bearer list includes bearer identifiers and indication information of the L radio bearers, the indication information is used to indicate whether a security configuration parameter needs to be configured for a corresponding radio bearer, and the security configuration parameters indicated in the second security configuration message that are configured for the K radio bearers are default security configuration parameters pre-obtained by the terminal device; or the second bearer list includes bearer identifiers of the L radio bearers and the security configuration parameter of each of the K radio bearers.

In this implementation, for the second bearer list, refer to the implementation of the second security configuration message in the embodiment shown in FIG. 3.

Optionally, the security configuration parameter may include one or more of the following parameters: an integrity protection parameter and an encryption parameter.

Optionally, the L radio bearers are set up on one or more of the following protocol layers: a PDCP layer, an RLC layer, and a MAC layer. For an implementation thereof, refer to the implementation of configuring the security configuration parameter for the radio bearer on the PDCP layer, the RLC layer, and the MAC layer in the embodiment shown in FIG. 2.

In this embodiment, targeted matching between a security configuration parameter and a service feature is more easily performed in the management entity. Therefore, precision of the security configuration parameter configured by the terminal device for the radio bearer may be higher by using the second security configuration message sent by the management entity.

Figure 8:
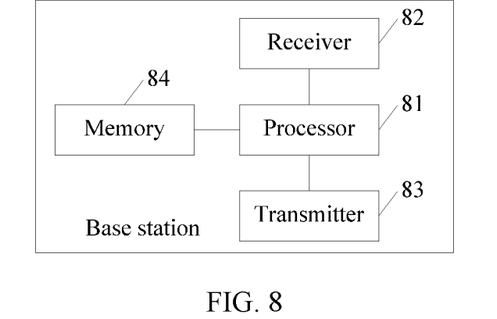
FIG. 8 is a schematic structural diagram of another base station according to an embodiment of the present disclosure.

Referring to FIG. 8, FIG. 8 is a schematic structural diagram of another base station according to an embodiment of the present disclosure. As shown in FIG. 8, the base station includes: a processor 81, a receiver 82, a transmitter 83, and a memory 84. In addition, in this embodiment of the present disclosure, the transceiver unit 52 in the embodiment shown in FIG. 5 may be implemented by the receiver 82 and the transmitter 83, and the processing unit 51 may be implemented by the processor 81. In addition, the processor 81 may implement the function of the processing unit 51 in the embodiment shown in FIG. 5. In addition, the memory 84 may be configured to store a program/code pre-installed at delivery of the base station, or may be configured to store code or the like during execution of the processor 81. The processor 81 executes the program stored in the memory 84 to implement the following method:

obtaining a first security configuration message, where the first security configuration message is used to indicate whether security configuration needs to be performed on each of N radio bearers set up between the base station and a terminal device, and indicate security configuration parameters for M radio bearers on which security configuration needs to be performed, where N is a positive integer, M is an integer, and M≤N; and sending the first security configuration message to the terminal device.

Optionally, the first security configuration message may include a first bearer list.

The first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

Optionally, the security configuration parameter may include one or more of the following parameters: an integrity protection parameter and an encryption parameter.

Optionally, the step of obtaining a first security configuration message that is performed by the processor 81 may include:

receiving a second security configuration message sent by a management entity, where the second security configuration message is used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M; and generating the first security configuration message based on the second security configuration message and a context of the terminal device.

Optionally, the base station may be a base station currently serving the terminal device, and the step of obtaining a first security configuration message that is performed by the processor 81 may include:

when the terminal device needs to be handed over to a target base station, receiving the first security configuration message sent by the target base station.

Optionally, the N radio bearers may be set up on one or more of the following protocol layers: a PDCP layer, an RLC layer, and a MAC layer.

It should be noted that the base station provided in this embodiment may be the base station in the embodiments shown in FIG. 1 to FIG. 7, and any implementation of the base station provided in the embodiments shown in FIG. 1 to FIG. 7 can be implemented by the base station provided in this embodiment.

In this embodiment, the security configuration parameter may be separately configured for the bearer of the terminal device. Therefore, applicability of security configuration can be improved, and a communications resource can be saved.

Figure 9:
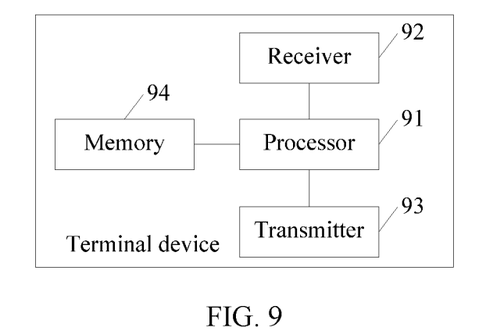
FIG. 9 is a schematic structural diagram of another terminal device according to an embodiment of the present disclosure.

Referring to FIG. 9, FIG. 9 is a schematic structural diagram of another terminal device according to an embodiment of the present disclosure. As shown in FIG. 9, the terminal device includes: a processor 91, a receiver 92, a transmitter 93, and a memory 94. In addition, in this embodiment of the present disclosure, the transceiver unit 61 in the embodiment shown in FIG. 6 may be implemented by the receiver 92 and the transmitter 93, and the processing unit 62 may be implemented by the processor 91. In addition, the processor 91 may implement the function of the processing unit 62 in the embodiment shown in FIG. 6. In addition, the memory 94 may be configured to store a program/code pre-installed at delivery of the terminal device, or may be configured to store code or the like during execution of the processor 91. The processor 91 executes the program stored in the memory 94 to implement the following method:

receiving a first security configuration message sent by a base station, where the first security configuration message is used to indicate whether security configuration needs to be performed on each of N radio bearers set up between the base station and the terminal device, and indicate security configuration parameters for M radio bearers on which security configuration needs to be performed, where N is a positive integer, M is an integer, and M≤N; and configuring the security configuration parameters for the M radio bearers by using the first security configuration message.

Optionally, the first security configuration message may include a first bearer list.

The first bearer list includes bearer identifiers and indication information of the N radio bearers and the security configuration parameters of the M radio bearers, and the indication information is used to indicate whether a security configuration parameter needs to be configured for a corresponding radio bearer; or the first bearer list includes bearer identifiers and indication information of the N radio bearers, the indication information is used to indicate whether a security configuration parameter needs to be configured for a corresponding radio bearer, and the security configuration parameters indicated in the first security configuration message that are configured for the M radio bearers are default security configuration parameters pre-obtained by the terminal device; or the first bearer list includes bearer identifiers of the M radio bearers and the security configuration parameter of each of the M radio bearers.

Optionally, the security configuration parameter may include one or more of the following parameters: an integrity protection parameter and an encryption parameter.

Optionally, the step performed by the processor 91 may further include:

reporting security capability information to a management entity, where the first security configuration message is generated by the base station based on a second security configuration message and a context of the terminal device, and the second security configuration message is received by the base station and sent by the management entity, and is generated by the management entity based on the security capability information to be used to indicate whether security configuration needs to be performed on each of L radio bearers corresponding to the management entity, and indicate security configuration parameters for K radio bearers on which security configuration needs to be performed, where L is a positive integer greater than or equal to N, and K is an integer greater than or equal to M.

Optionally, the step of configuring the security configuration parameters for the M radio bearers by using the first security configuration message that is performed by the processor 91 may include:

configuring the security configuration parameters for the M radio bearers on a PDCP layer, an RLC layer, or a MAC layer.

It should be noted that the terminal device provided in this embodiment may be the terminal device in the embodiments shown in FIG. 1 to FIG. 7, and any implementation of the terminal device provided in the embodiments shown in FIG. 1 to FIG. 7 can be implemented by the terminal device provided in this embodiment.

In this embodiment, the security configuration parameter may be separately configured for the bearer of the terminal device. Therefore, applicability of security configuration can be improved, and a communications resource can be saved.

Figure 10:
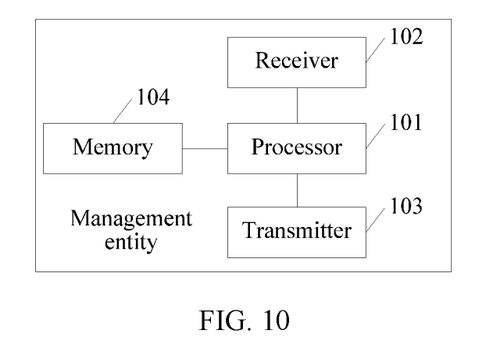
FIG. 10 is a schematic structural diagram of another management entity according to an embodiment of the present disclosure.

Referring to FIG. 10, FIG. 10 is a schematic structural diagram of another management entity according to an embodiment of the present disclosure. As shown in FIG. 10, the management entity includes: a processor 101, a receiver 102, a transmitter 103, and a memory 104. In addition, in this embodiment of the present disclosure, the transceiver unit 71 in the embodiment shown in FIG. 7 may be implemented by the receiver 102 and the transmitter 103, and the processing unit 72 may be implemented by the processor 101. In addition, the processor 101 may implement the function of the processing unit 72 in the embodiment shown in FIG. 7. In addition, the memory 104 may be configured to store a program/code pre-installed at delivery of the management entity, or may be configured to store code or the like during execution of the processor 81. The processor 101 executes the program stored in the memory 104 to implement the following method:

sending a second security configuration message to a base station, where the second security configuration message is used to indicate whether security configuration needs to be performed on each of L radio bearers corresponding to the management entity, and indicate security configuration parameters for K radio bearers on which security configuration needs to be performed, and is used to enable the base station to generate a first security configuration message based on the second security configuration message and a context of a terminal device, and the first security configuration message is used to indicate whether security configuration needs to be performed on each of N radio bearers set up between the base station and the terminal device, and indicate security configuration parameters for M radio bearers on which security configuration needs to be performed, where N is a positive integer, M is an integer, M≤N, L is a positive integer greater than or equal to N, and K is an integer greater than or equal to M.

Optionally, the program executed by the processor 101 may further include:

receiving security capability information reported by the terminal device, and generating the second security configuration message based on the security capability information; or generating the second security configuration message based on channel quality or a service parameter of the terminal device.

Optionally, the second security configuration message includes a second bearer list.

The second bearer list includes bearer identifiers and indication information of the L radio bearers and the security configuration parameters of the K radio bearers on which security configuration needs to be performed, and the indication information is used to indicate whether a security configuration parameter needs to be configured for a corresponding radio bearer; or the second bearer list includes bearer identifiers and indication information of the L radio bearers, the indication information is used to indicate whether a security configuration parameter needs to be configured for a corresponding radio bearer, and the security configuration parameters indicated in the second security configuration message that are configured for the K radio bearers are default security configuration parameters pre-obtained by the terminal device; or the second bearer list includes bearer identifiers of the L radio bearers and the security configuration parameter of each of the K radio bearers.

Optionally, the security configuration parameter includes one or more of the following parameters: an integrity protection parameter and an encryption parameter.

Optionally, the L radio bearers are set up on one or more of the following protocol layers: a PDCP layer, an RLC layer, and a MAC layer.

It should be noted that the management entity provided in this embodiment may be the management entity in the embodiments shown in FIG. 1 to FIG. 7, and any implementation of the management entity provided in the embodiments shown in FIG. 1 to FIG. 7 can be implemented by the base station provided in this embodiment.

In this embodiment, targeted matching between a security configuration parameter and a service feature is more easily performed in the management entity. Therefore, precision of the security configuration parameter configured by the terminal device for the radio bearer may be higher by using the second security configuration message sent by the management entity.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disc, a compact disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A security configuration method for a radio bearer, comprising:

receiving, by a terminal device, a first security configuration message sent by a base station, wherein the first security configuration message is used to indicate whether security configuration needs to be performed on each of a total of a first number of radio bearers set up between the base station and the terminal device, and indicate security configuration parameters for, within the first number of radio bearers, a second number of radio bearers on which security configuration needs to be performed, wherein the first number is a positive integer, the second number is an integer, and the second number is less than or equal to the first number; and configuring, by the terminal device, the security configuration parameters for the second number of radio bearers by using the first security configuration message.

2. The method according to claim 1, wherein the first security configuration message comprises a first bearer list, wherein the first bearer list comprises bearer identifiers and indication information of the first number of radio bearers and the security configuration parameters of the second number of radio bearers, and the indication information is used to indicate whether a security configuration parameter needs to be configured for a corresponding radio bearer; or the first bearer list comprises bearer identifiers and indication information of the first number of radio bearers, the indication information is used to indicate whether a security configuration parameter needs to be configured for a corresponding radio bearer, and the security configuration parameters indicated in the first security configuration message that are configured for the second number of radio bearers are default security configuration parameters pre-obtained by the terminal device; or the first bearer list comprises bearer identifiers of the second number of radio bearers and the security configuration parameter of each of the second number of radio bearers.

3. The method according to claim 1, wherein the security configuration parameter comprises one or more of the following parameters: an integrity protection parameter or an encryption parameter.

4. The method according to claim 1, wherein the method further comprises:

reporting, by the terminal device, security capability information to a management entity, wherein the first security configuration message is generated by the base station based on a second security configuration message and a context of the terminal device, and the second security configuration message is received by the base station and sent by the management entity, and is generated by the management entity based on the security capability information to be used to indicate whether security configuration needs to be performed on each of a third number of radio bearers corresponding to the management entity, and indicate security configuration parameters for a fourth number of radio bearers on which security configuration needs to be performed, wherein the third number is a positive integer greater than or equal to the first number, and the fourth number is an integer greater than or equal to the second number.

5. The method according to claim 1, wherein the configuring, by the terminal device, the security configuration parameters for the second number of radio bearers by using the first security configuration message comprises:
    configuring, by the terminal device, the security configuration parameters for the second number of radio bearers on a PDCP layer, an RLC layer, or a MAC layer.

6. A base station, comprising a processor and a transceiver, wherein
    the processor is configured to obtain a first security configuration message, wherein the first security configuration message is used to indicate whether security configuration needs to be performed on each of a total of a first number of radio bearers set up between the base station and a terminal device, and indicate security configuration parameters for, within the first number of radio bearers, a second number of radio bearers on which security configuration needs to be performed, wherein the first number is a positive integer, the second number is an integer, and the second number is less than or equal to the first number; and
    the transceiver is configured to send the first security configuration message to the terminal device.

7. The base station according to claim 6, wherein the first security configuration message comprises a first bearer list, wherein
    the first bearer list comprises bearer identifiers and indication information of the first number of radio bearers and the security configuration parameters of the second number of radio bearers, and the indication information is used to indicate whether a security configuration parameter needs to be configured for a corresponding radio bearer; or
    the first bearer list comprises bearer identifiers and indication information of the first number of radio bearers, the indication information is used to indicate whether a security configuration parameter needs to be configured for a corresponding radio bearer, and the security configuration parameters indicated in the first security configuration message that are configured for the second number of radio bearers are default security configuration parameters pre-obtained by the terminal device; or
    the first bearer list comprises bearer identifiers of the second number of radio bearers and the security configuration parameter of each of the second number of radio bearers.

8. The base station according to claim 6, wherein the security configuration parameter comprises one or more of the following parameters: an integrity protection parameter or an encryption parameter.

9. The base station according to claim 6, wherein the transceiver is further configured to receive a second security configuration message sent by a management entity, wherein the second security configuration message is used to indicate whether security configuration needs to be performed on each of a third number of radio bearers corresponding to the management entity, and indicate security configuration parameters for a fourth number of radio bearers on which security configuration needs to be performed, wherein the third number is a positive integer greater than or equal to the first number, and the fourth number is an integer greater than or equal to the second number; and
    the processor is configured to generate the first security configuration message based on the second security configuration message and a context of the terminal device.

10. The base station according to claim 6, wherein the base station is a base station currently serving the terminal device, and the processor is configured to: when the terminal device needs to be handed over to a target base station, receive, by using the transceiver unit, the first security configuration message sent by the target base station.

11. The base station according to claim 6, wherein the first number of radio bearers are set up on one or more of the following protocol layers: a PDCP layer, an RLC layer, and a MAC layer.

12. A terminal device, comprising a transceiver and a processor, wherein
    the transceiver is configured to receive a first security configuration message sent by a base station, wherein the first security configuration message is used to indicate whether security configuration needs to be performed on each of a total of a first number of radio bearers set up between the base station and the terminal device, and indicate security configuration parameters for, within the first number of radio bearers, a second number of radio bearers on which security configuration needs to be performed, wherein the first number is a positive integer, the second number is an integer, and the second number is less than or equal to the first number; and
    the processor is configured to configure the security configuration parameters for the second number of radio bearers by using the first security configuration message.

13. The terminal device according to claim 12, wherein the first security configuration message comprises a first bearer list, wherein
    the first bearer list comprises bearer identifiers and indication information of the first number of radio bearers and the security configuration parameters of the second number of radio bearers, and the indication information is used to indicate whether a security configuration parameter needs to be configured for a corresponding radio bearer; or
    the first bearer list comprises bearer identifiers and indication information of the first number of radio bearers, the indication information is used to indicate whether a security configuration parameter needs to be configured for a corresponding radio bearer, and the security configuration parameters indicated in the first security configuration message that are configured for the second number of radio bearers are default security configuration parameters pre-obtained by the terminal device; or
    the first bearer list comprises bearer identifiers of the second number of radio bearers and the security configuration parameter of each of the second number of radio bearers.

14. The terminal device according to claim 12, wherein the security configuration parameter comprises one or more of the following parameters: an integrity protection parameter or an encryption parameter.

15. The terminal device according to claim 12, wherein the transceiver is further configured to report security capability information to a management entity, wherein the first security configuration message is generated by the base station based on a second security configuration message and a context of the terminal device, and the second security configuration message is received by the base station and sent by the management entity, and is generated by the management entity based on the security capability information to be used to indicate whether security configuration needs to be performed on each of a third number of radio bearers corresponding to the management entity, and indicate security configuration parameters for a fourth number of radio bearers on which security configuration needs to be performed, wherein the third number is a positive integer greater than or equal to the first number, and the fourth number is an integer greater than or equal to the second number.

16. The terminal device according to claim 12, wherein the processor is configured to configure the security configuration parameters for the second number of radio bearers on a PDCP layer, an RLC layer, or a MAC layer.

* * * * *